United States Patent [19]
Abe et al.

[11] Patent Number: 5,648,132
[45] Date of Patent: Jul. 15, 1997

[54] COMPOSITE INSULATOR, SEGMENT USED FOR PRODUCING THE SAME AND METHOD OF PRODUCING THE SAME BY USING THE SEGMENT

[75] Inventors: Tetsuhiko Abe, Kasugai; Shigehiko Kunieda, Iwakura; Isao Nakajima; Yusuke Utsumi, both of Nagoya, all of Japan

[73] Assignee: NGK Insulators, Ltd., Japan

[21] Appl. No.: 477,834

[22] Filed: Jun. 7, 1995

[30] Foreign Application Priority Data

Dec. 28, 1994 [JP] Japan ................... 6-327684

[51] Int. Cl.⁶ .................... B29C 45/03; B29C 45/14; B29C 45/17; H01B 17/60
[52] U.S. Cl. ............... 428/36.9; 174/176; 174/179; 174/209; 174/211; 249/126; 264/328.1; 264/328.8; 425/190; 425/192 R
[58] Field of Search ............... 428/36.9; 174/209, 174/211, 176, 179; 425/190, 192 R; 264/328.1, 328.8; 249/126

[56] References Cited

U.S. PATENT DOCUMENTS

| 4,053,707 | 10/1977 | Ely et al. ................... 174/209 |
| 4,129,745 | 12/1978 | Korischum ................ 174/209 |
| 4,174,464 | 11/1979 | Kawaguchi et al. ........ 174/211 |
| 4,724,284 | 2/1988 | Wheeler ..................... 174/209 |
| 4,973,798 | 11/1990 | Parraud et al. ............. 174/209 |
| 5,523,038 | 6/1996 | Kunieda et al. ............ 174/179 |

FOREIGN PATENT DOCUMENTS 15533  6/1979  Japan ................... 249/126

Primary Examiner—James C. Cannon
Attorney, Agent, or Firm—Parkhurst, Wendel & Burr, L.L.P.

[57] ABSTRACT

A composite insulator having a core member and a housing member integrally arranged around the core member, the housing member being constructed by a trunk portion and a shed portion, has a creepable distance extending means arranged on a lower plane of the shed portion. Moreover, a segment used for producing the composite insulator has a pair of segment molds detachably connected at a partition plane having a through-hole at its center portion through which the core member is arranged, an upper plane forming portion arranged at its one end surface for defining an upper plane of the shed portion, and a lower plane forming portion arranged at its other end surface for defining a lower plane of the shed portion; and a partition for forming the creepage distance extending means arranged at the lower plane forming portion. Further, the composite insulator is produced by arranging the core member in a through-hole of a mold constructed by integrating a plurality of segments, supplying an elastic polymer material into a space between the mold and the core member, curing the elastic polymer material and separating the mold at the partition plane.

6 Claims, 5 Drawing Sheets

FIG_1a
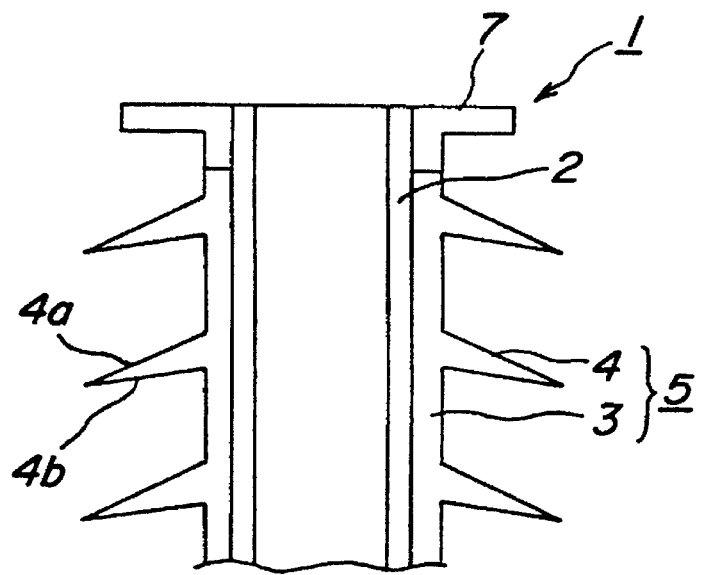
FIG_1b
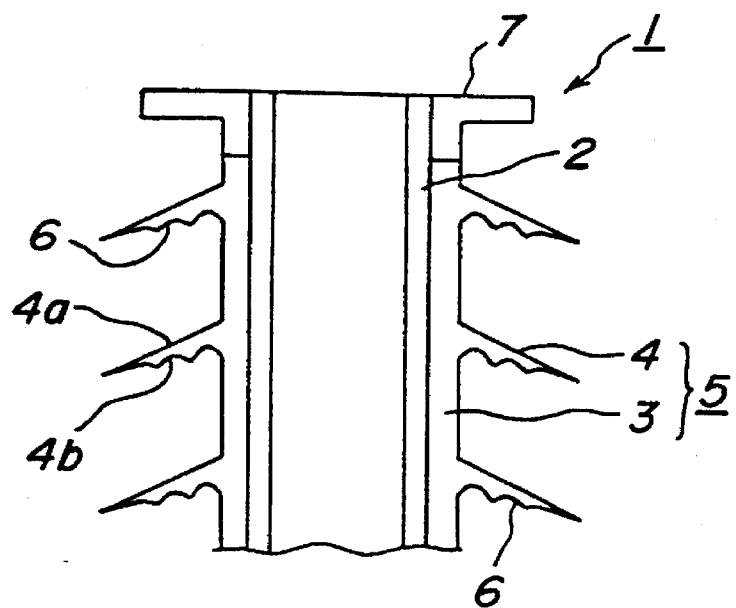

FIG_6
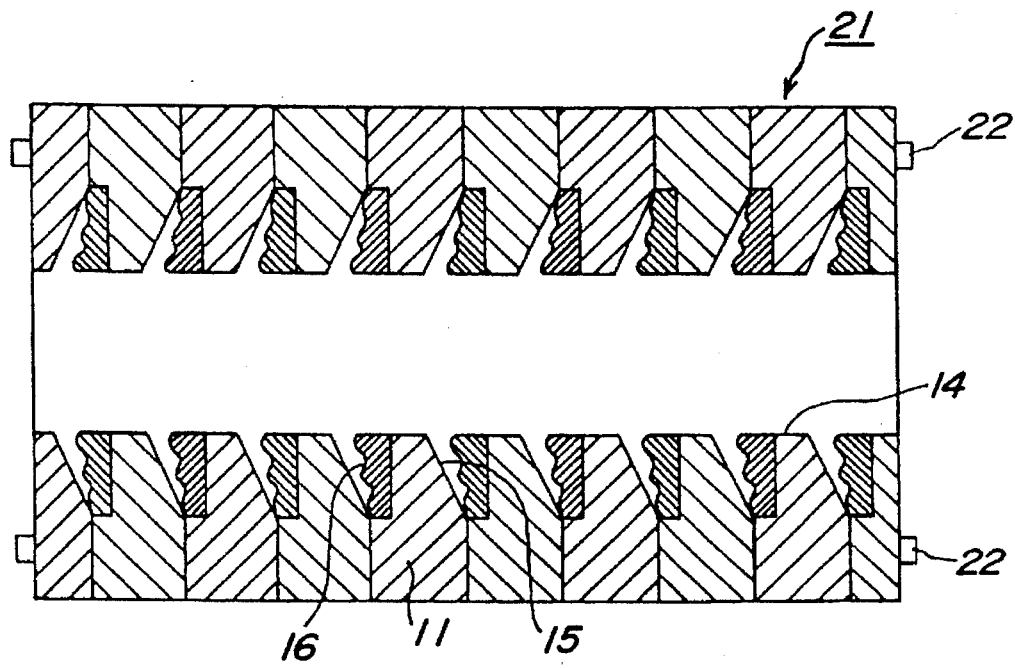
FIG_7
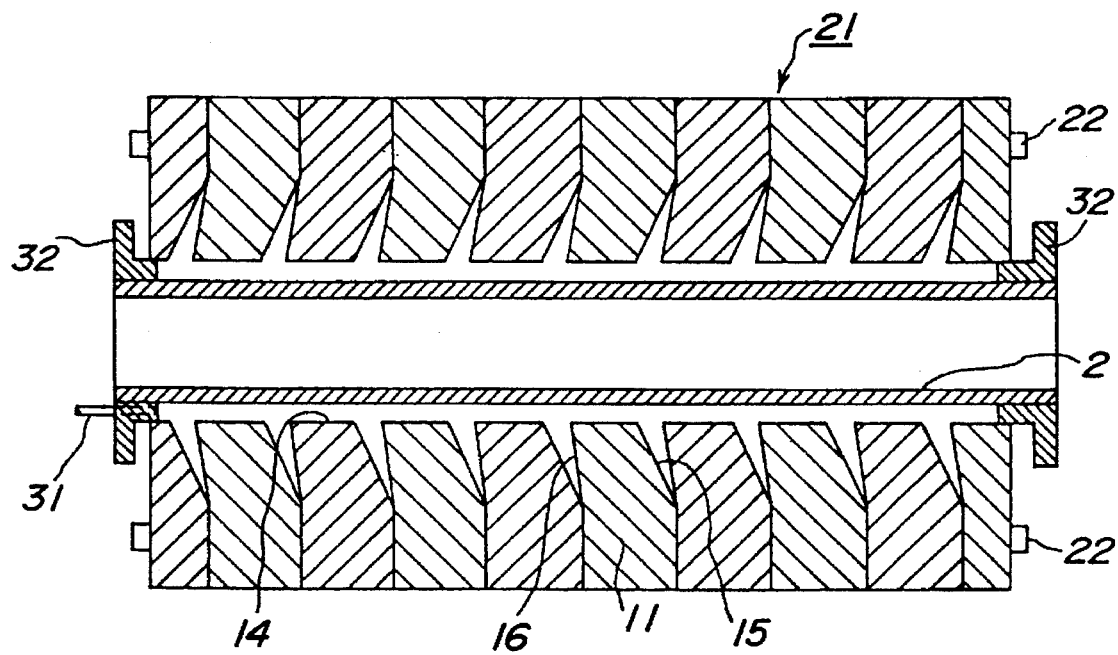

FIG_8
PRIOR ART
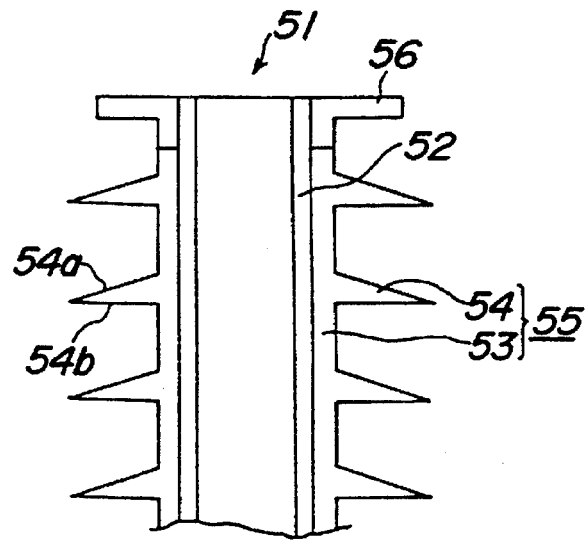
FIG_9
PRIOR ART
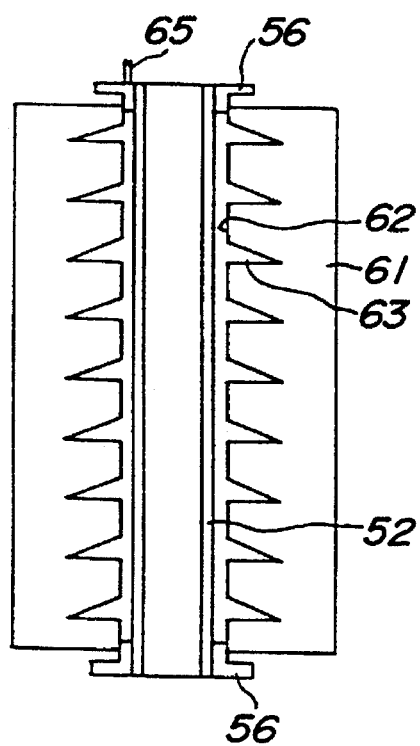

COMPOSITE INSULATOR, SEGMENT USED FOR PRODUCING THE SAME AND METHOD OF PRODUCING THE SAME BY USING THE SEGMENT

BACKGROUND OF THE INVENTION

1. Field of the Invention

The present invention relates to a composite insulator, a segment used for producing the composite insulator and a method of producing the composite insulator which can improve the composite insulator consisting of a core member and a housing member arranged around the core member, the housing member being constructed by a trunk portion and a shed portion.

2. Related Art Statement

Generally, various types of insulators have been known as insulation members for use as a main body of, for example, a bushing. FIG. 8 is a schematic view showing one embodiment of a known composite insulator. In FIG. 8, a composite insulator 51 comprises a core member 52 made of, for example, a FRP tube, and a housing member 55 arranged around the core member 52. Moreover, the housing member 55 is constructed by a trunk portion 53 and a plurality of shed portions 54 arranged outwardly from the trunk portion 53. Further, fitting members 56 are arranged at both end portions of the core member 52. In the known composite insulator 51 mentioned above, the housing member 55 comprising by the trunk portion 53 and the shed portion 54 is preferably made of a silicone rubber. The shed portion 54 has an upper plane 54a and a lower plane 54b. Here, the upper plane 54a and the lower plane 54b mean planes positioned at an upper side and at a lower side of the shed portion 54 with respect to the upright composite insulator 51.

The known composite insulator 51 having the construction mentioned above is produced by using a mold 61 as shown in FIG. 9. In FIG. 9, the mold 61 comprises a through-hole 62 through which the core member 52 made of the FRP tube is arranged, and a shed forming recess 63 for forming the shed portion 54. The mold 61 may be formed by an integral type. At first, the core member 52 is set in the through-hole 62 by means of the fitting members 56. Since an outer diameter of the core member 52 is smaller than an inner diameter of the through-hole 62, a space for forming the trunk portion 53 can be arranged between the core member 52 and the mold 61. Then, an elastic polymer material, preferably a silicone rubber, is supplied from an elastic polymer material inlet 65 into the space between the core member 52 and the mold 61. The supplied elastic polymer material is then cured by heating the mold 61. Finally, the mold 61 is moved for example downwardly to obtain the composite insulator 51. In this case, since the elastic polymer material after curing maintains its elasticity, the shed portion 54 is not damaged even if the mold 61 is forcedly pulled out from the composite insulator 51.

In the known composite insulator 51, a shape of the lower plane 54b of the shed portion 54 is plain. This is because, in a producing method of the known composite insulator 51, it is not easy to remove the mold 61 and also it is difficult to supply the silicone rubber into a tip of the shed portion 54, if the shed forming recess 63 of the mold 61 has a complicated shape. Therefore, since it is not possible to increase longer a creepage distance on the shed portion 54, there occurs a drawback that the composite insulator 51 can not be constructed in a compact manner. Moreover, in the case of using a thin shed portion 54, the composite insulator 51 is not damaged if the mold 61 is pulled out from the composite insulator 51. However, if the shed portion 54 is made thicker, it is difficult to remove the mold 61 from the composite insulator 51, and thus, in an extreme case, the shed portion 54 is fractured. Further, if the composite insulator 51 is produced by forming the shed portion 54 and the trunk portion 53 by means of a mechanical working without using the mold 61, it is difficult to work the lower plane 54b of the shed portion 54 into a complicated shape.

SUMMARY OF THE INVENTION

An object of the present invention is to eliminate the drawbacks mentioned above, and to provide a composite insulator, a segment used for producing the composite insulator and a method of producing the composite insulator by using the segment, which achieves increased creepage distance and compact construction.

According to the invention, a composite insulator having a core member and a housing member integrally arranged around the core member, wherein the housing member is constructed by a trunk portion and a shed portion, comprises a creepage distance extending means arranged on a lower plane of the shed portion.

Moreover, according to the invention, a segment used for producing the composite insulator having a core member and a housing member integrally arranged around the core member, wherein the housing member is constructed by a trunk portion and a shed portion, comprises a pair of segment molds detachably connected at a partition plane having a through-hole at its center portion through which the core member is arranged, an upper plane forming portion arranged at its one end surface for defining an upper plane of the shed portion, and a lower plane forming portion arranged at its other end surface for defining a lower plane of the shed portion; and a portion for forming the creepage distance extending means arranged at the lower plane forming portion.

Further, according to the invention, a method of producing the composite insulator having a core member and a housing member integrally arranged around the core member, wherein the housing member is constructed by a trunk portion and a shed portion, by using the segment having a pair of segment molds detachably connected at a partition plane having a through-hole at its center portion through which the core member is arranged, an upper plane forming portion arranged at its one end surface for defining an upper plane of the shed portion, and a lower plane forming portion arranged at its other end surface for defining a lower plane of the shed portion; and a portion for forming a creepage distance extending means arranged at the lower plane forming portion, comprises the steps of arranging the core member in a through-hole of a mold constructed by integrating a plurality of the segments, supplying an elastic polymer material into a space between the mold and the core member, curing the elastic polymer material and separating the mold at the partition plane to obtain the composite insulator.

The term "insulator" used in this application includes a so-called hollow insulator. The "hollow insulator" is an insulating member to be used in a bushing body, and has a through-hole through which a conducting member is passed in an axial direction. The "bushing" means a device for supporting a conductive member through a wall or a partition wall in an insulated manner when the conducting member is passed through the wall or the partition wall of a tank or the like.

In the composite insulator mentioned above, the creepage distance extending means functions to make the creepage distance on the shed portion longer as compared with the known composite insulator. Therefore, the composite insulator having a compact construction can be produced. Moreover, in the segment mentioned above, the upper plane forming portion and the lower plane forming portion including the portion for forming the creepage distance extending means can make a shape of the shed portion of the composite insulator when the mold is constructed by integrating a plurality of the segments. Therefore, it is possible to obtain the composite insulator having the creepage distance extending means according to the invention. Further, in the method of producing the composite insulator, since the segment can be separated at the partition plane to the segment molds, the mold constructed by integrating a plurality of segments can also be separated at the partition plane. Therefore, the shed portion is not damaged at all when the mold is detached from the composite insulator. Moreover, in this case, it is possible to use a core as the portion for forming the creepage distance extending means.

BRIEF DESCRIPTION OF THE DRAWINGS

FIGS. 1a and 1b are schematic views respectively showing one embodiment of a composite insulator according to the invention;

FIG. 6 is a schematic view depicting another embodiment of the mold constructed by a plurality of segments used for producing the composite insulator according to the invention;

FIG. 7 is a schematic view for explaining one embodiment of a method of producing the composite insulator by using the mold constructed by a plurality of segments;

FIG. 8 is a schematic view showing one embodiment of the known composite insulator; and FIG. 9 is a schematic view illustrating one embodiment of a mold used for producing the known composite insulator.

DESCRIPTION OF THE PREFERRED EMBODIMENT

Figure 2A:
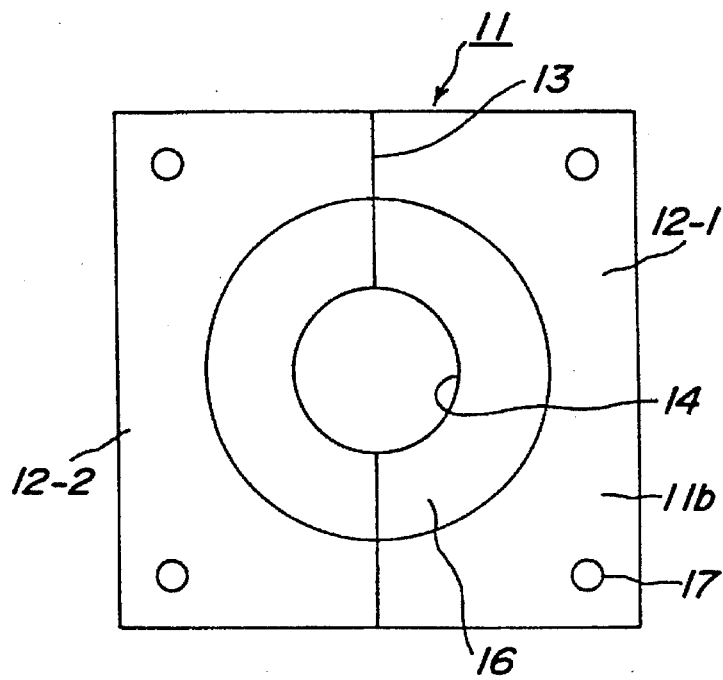
FIGS. 2a and 2b are a front view and a cross sectional view respectively illustrating one embodiment of a segment used for producing the composite insulator according to the invention.

FIG. 1 is a schematic view showing one embodiment of a composite insulator according to the invention, in which FIG. 1a illustrates an embodiment where a taper portion is used as a creepage distance extending means and FIG. 1b depicts an embodiment where an under rib is used as the creepage distance extending means. In FIGS. 1a and 1b, a composite insulator 1 according to the invention is constructed by a core member 2 made of, for example, FRP tubing, and a housing member 5 made of an elastic polymer material such as a silicone rubber or the like which is arranged around the core member 2. Fitting members 7 are arranged at both end portions of the core member 2. The housing member 5 comprises a trunk portion 3 and a plurality of shed portions 4 arranged outwardly from the trunk portion 3. The shed portion 4 has an upper plane 4a and a lower plane 4b. In this case, the upper plane 4a and the lower plane 4b mean planes positioned at an upper side and a lower side of the shed portion 4 respectively with respect to the upright composite insulator 1.

In this embodiment, the most important feature of the composite insulator is that the creepage distance extending means is arranged on the lower plane 4b of the shed portion 4. That is to say, in the embodiment shown in FIG. 1a, the creepage distance extending means is constructed by faxing the lower plane 4b of the shed portion 4 into a taper shape. Therefore, it is possible to make the creepage distance on the shed portion 4 longer as compared with the case in which the lower plane 4b is plain as shown in FIG. 3. Moreover, since the taper shape of the lower plane 4b is formed in such a manner that a tip portion is positioned lower than a portion connected to the trunk portion 3 as is the same as the upper plane 4a, it is possible to improve a water dripping effect of the shed portion 4. Further, in the embodiment shown in FIG. 1b, the creepage distance extending means is constructed by forming a plurality of under ribs 6 on the lower plane 4b of the shed portion 4. Therefore, it is possible to make the creepage distance on the shed portion 4 longer as is the same as the embodiment shown in FIG. 1a. Moreover, such a structure is preferred since the creepage distance can be made longer than that of FIG. 1a. In this invention, it should be noted that the construction of the creepage distance extending means is not limited to the embodiments shown in FIGS. 1a and 1b.

Figure 2B:
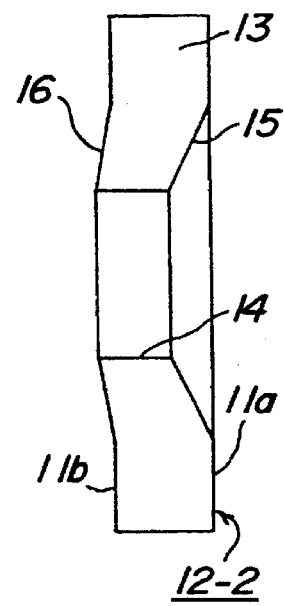

FIG. 2 is a schematic view showing one embodiment of a segment used for producing the composite insulator according to the invention, in which FIG. 2a illustrates a front view and FIG. 2b depicts a cross sectional view at a partition plane. In FIG. 2, a segment 11 comprises a pair of segment molds 12-1 and 12-2. The segment molds 12-1 and 12-2 are detachably connected with each other at a partition pane 13 to form the segment 11. A through-hole 14, through which the core portion 2 is arranged, is formed at a center portion of the segment 11. In this case, it is necessary to make a diameter of the through-hole 14 larger than an outer diameter of the core member 2 of the composite insulator 1 by a thickness of the trunk portion 3.

An upper plane forming portion 15 having a taper shape is formed at one end surface 11a of the segment 11. When the mold is constructed by using a plurality of segments 11 as explained later herein, the upper plane forming portion 15 defines the upper plane 4a of the shed portion 4. Moreover, a lower plane forming portion 16 having a taper shape is formed at the other end surface 11b of the segment 11 in the same manner. The lower plane forming portion 16 defines the lower plane 4b of the shed portion 4. In order to make a space for forming the shed portion in the mold constructed by using a plurality of segments 11, it is necessary to set an inclination of the upper plane forming portion 15 gentler than that of the lower plane forming portion 16 as shown in FIG. 2. In this embodiment, the lower plane forming portion 16 is denoted as a portion for forming the creepage distance extending means. Moreover, a numeral 17 is a hole for passing a connection bolt in the case of forming the mold by using a plurality of segments 11.

Figure 3A:
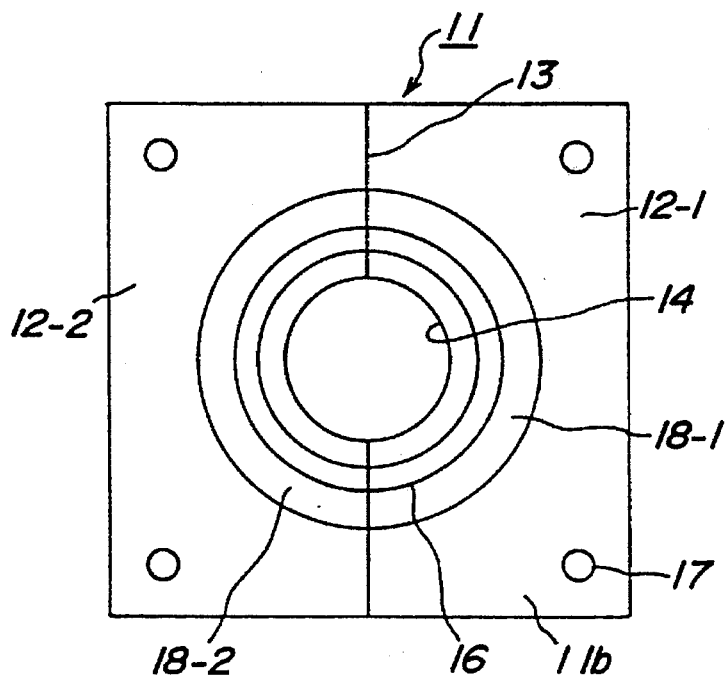
FIGS. 3a and 3b are a front view and a cross sectional view respectively depicting another embodiment of the segment used for producing the composite insulator according to the invention.
Figure 3B:
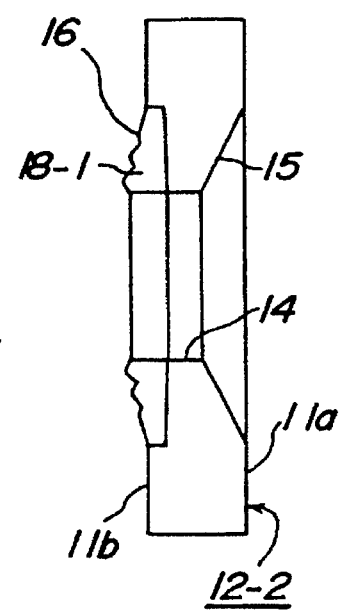

FIG. 3 is a schematic view showing another embodiment of the segment used for producing the composite insulator according to the invention, in which FIG. 3a illustrates a front view and FIG. 3b depicts a cross sectional view at the partition plane. In FIG. 3, portions similar to those of FIG. 2 are denoted by the same reference numerals and the explanations thereof are omitted here. In FIG. 3, the feature different from that of FIG. 2 is that the lower plane forming portion 16 is constructed by a pair of cores 18-1 and 18-2 which are detachably connected at the partition plane 13. In this embodiment, a concave portion and a convex portion are alternately formed on surfaces of the cores 18-1 and 18-2, these uneven surfaces of the cores 18-1 and 18-2 can form the under rib 6 of the shed portion 4 shown in FIG. 4b. In the embodiment shown in FIG. 3, since the segment molds 12-1, 12-2 and the cores 18-1, 18-2 can be separately detached from the composite insulator 1 as compared with the embodiment shown in FIG. 2, it is possible to form easily the lower plane 4b of the shed portion 4 having the complicated shape such as the under rib 6 or the like. Therefore, the embodiment shown in FIG. 3 is preferred for forming the complicated portion.

As for a material of the cores 18-1, 18-2, it is necessary to use a material having soft and light characteristics such as rubber, resin or the like which does not damage the composite insulator 1. Moreover, if the cores 18-1, 18-2 are made of a material which can maintain the shape in the case of supplying an elastic polymer material having a temperature of about 80° C. and can be turned into a fluid state in the case of heating to about 100° C. after a curing operation, it is possible to ease the detaching operation of the cores. Further, if the cores 18-1, 18-2 are made of a rubber shrinkable by air supplying and discharging operations, it is possible to maintain the shapes of the cores 18-1, 18-2 by the air supplying operation and to shrink them by the air discharging operation so as to detach the cores from the composite insulator. Also in this case, it is possible to simplify the detaching operation of the cores.

Figures 4A, 4B:
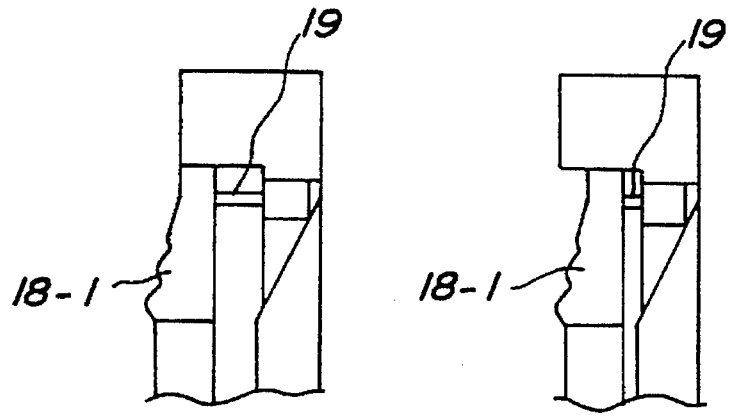
FIGS. 4a and 4b are a front view and a cross sectional view respectively showing still another embodiment of the segment used for producing the composite insulator according to the invention.

FIG. 4 is a schematic view showing still another embodiment of the segment used for producing the composite insulator according to the invention, in which FIG. 4a illustrates a state of the curing operation and FIG. 4b depicts a state of the detaching operation. In FIG. 4, portions similar to those of FIG. 2 are denoted by the same reference numerals and the explanations thereof are omitted here. In the embodiment shown in FIG. 4, the cores 18-1, 18-2 are formed movably in such a manner that they can position the curing state shown in FIG. 4a and the detaching state shown in FIG. 4b by using a drive means 19 such as an air cylinder or the like. Therefore, also in the embodiment shown in FIG. 4, it is possible to simplify the detaching operation of the cores.

Figure 5:
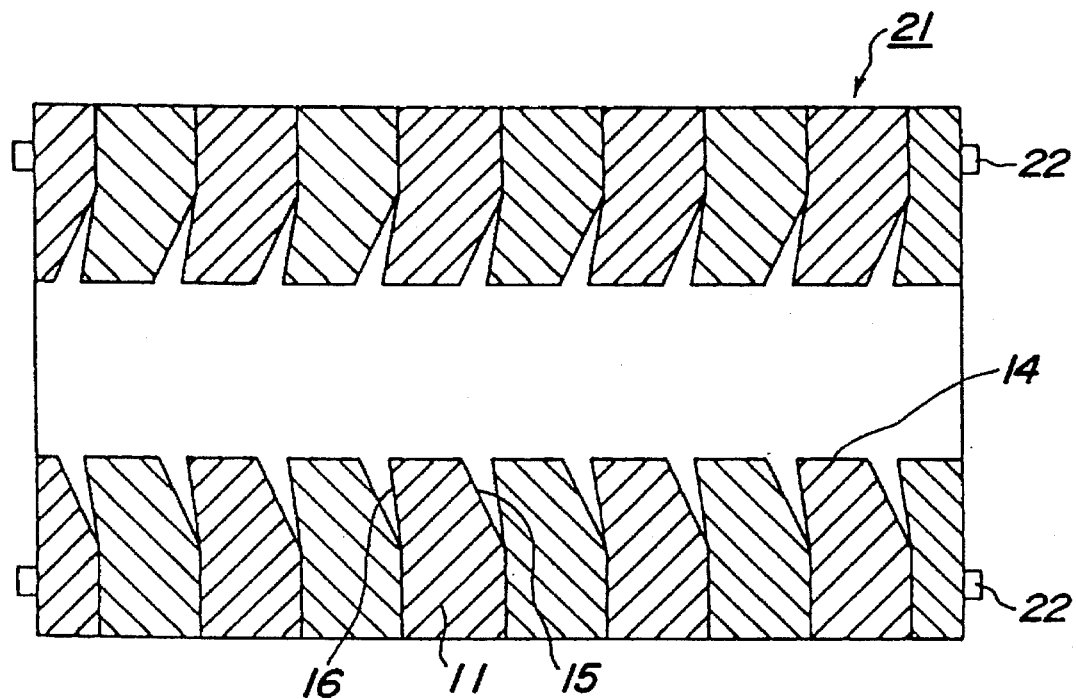
FIG. 5 is a schematic view illustrating one embodiment of a mold constructed by a plurality of segments used for producing the composite insulator according to the invention.

FIG. 5 is a schematic view showing one embodiment of a mold constructed by a plurality of segments used for producing the composite insulator according to the invention. The embodiment shown in FIG. 5 is illustrated by a cross section at the partition plane 13, and each segments 11 has the construction shown in FIG. 2. In FIG. 5, a mold 21 is constructed by using a plurality of segments 11 in such a manner that tension bolts 22 are arranged through the through-holes 17 of the stacked segments 11 and nuts are engaged with the tension bolts 22 at its both ends so as to fasten the stacked segments 11 integrally. In this case, both of the outermost segments have a flat plane at its outermost surface. Moreover, FIG. 6 is a schematic view showing another embodiment of the mold constructed by a plurality of segments used for producing the composite insulator according to the invention. In this embodiment, each segments 11 has the cores 18-1, 18-2 shown in FIG. 3.

FIG. 7 is a schematic view for explaining one embodiment of a method of producing the composite insulator by using the mold 21 constructed by a plurality of segments 11 shown in FIG. 5. As shown in FIG. 7, at first, the core member 2 made of for example FRP tubing is set in the through-hole 14 of the mold 21 formed integrally by stacking a plurality of segments 11 in a fluid-tight manner by means of fitting metals 32 arranged at both ends of the core member 2. One of the fitting metals 32 has an elastic polymer material supply inlet 31. Then, an elastic polymer material preferably a silicone rubber is supplied from the elastic polymer material supply inlet 31 into a space between the mold 21 and the core member 2. Then, the thus supplied elastic polymer material is cured by heating or the like.

Thereafter, the tension bolts 22 are removed from the mold 21 so as to divide the mold 21 into a plurality of segment 11. Finally, each segments 11 is divided at the partition plane 13 and detached from the composite insulator. In this manner, the composite insulator 1 according to the invention can be obtained.

As can be clearly understood from the above explanations, according to the invention, since the composite insulator has the creepage distance extending means on the lower plane of the shed portion, it is possible to make the creepage distance on the shed portion longer than that of the known composite insulator. Therefore, it is possible to produce the composite insulator in a compact manner. Moreover, since the segment has the portion for forming the creepage distance extending means on the lower plane forming portion, the shed portion having the creepage distance extending means can be formed if the segments are stacked integrally to obtain the mold. Therefore, it is possible to produce the composite insulator having the creepage distance extending means at its shed portions. Further, since the mold can be divided into a plurality of segments and each segment can be divided into the segment molds, it is possible to eliminate the damage of the shed portion during the mold detaching operation. Furthermore, it is possible to use the core as the portion for forming the creepage distance extending means.

What is claimed is:
1. A polymer composite insulator, comprising:
  a core member and a housing member integrally arranged around said core member, said housing member having a trunk portion and a shed portion integrally formed therewith; and
  an under rib creepage distance extending means arranged on a lower plane of said shed portion.
2. The composite insulator according to claim 1, wherein said core member is an FRP tube.
3. A segment for producing a polymer composite insulator having a core member and a housing member integrally arranged around the core member, the housing member having an integrally formed trunk portion and shed portion, wherein the shed portion has an under rib creepage distance extending means on a lower plane thereof, comprising:
  a pair of segment molds detachably connected at a partition plane having a through-hole at its center portion through which the core member is arranged,
  wherein each of said segment molds has an upper plane forming portion arranged at a first end surface for defining an upper plane of the shed portion, and a lower plane forming portion arranged at a second end surface opposite said first end surface for defining the under rib creepage distance extending means on a lower plane of the shed portion, said lower plane forming portion comprising a detachable core having alternating concave and convex portions.

4. The segment according to claim 3, wherein the core is arranged movably by a drive means.

5. A method of producing a polymer composite insulator having a core member and a housing member integrally arranged around the core member, the housing member having an integrally formed trunk portion and shed portion, wherein the shed portion has an under rib creepage distance extending means on a lower plane thereof, comprising the steps of:

provideing a mold comprising a plurality of pairs of segment molds each being detachably connected at a partition plane and having a through-hole at a center portion thereof for receiving the core member, each of the segment molds having an upper plane forming portion arranged at a first end surface for defining an upper plane of the shed portion, and a lower plane forming portion arranged at a second end surface opposite the first end surface for defining the under rib creepage distance extending means, the lower plane forming portion including a detachable core having alternating concave and convex portions;

arranging the core member in the through-hole of each of the plurality of pairs of segment molds;

supplying an elastic polymer material into a space between the plurality of pairs of segment molds and the core member;

curing said elastic polymer material;

separating the plurality of pairs of segment molds at the partition plane; and separating the detachable cores from the segment molds and from said cured elastic polymer material to obtain said polymer composite insulator.

6. The method according to claim 5, wherein said elastic polymer material is a silicone rubber.

* * * * *